(12) United States Patent
Kopelman et al.

(10) Patent No.: US 7,813,967 B2
(45) Date of Patent: Oct. 12, 2010

(54) METHOD AND APPARATUS FOR LISTING GOODS FOR SALE

(75) Inventors: Joshua R Kopelman, Wynnewood, PA (US); Srinivas Balijepalli, Devon, PA (US); Christopher D Fralic, New Hope, PA (US)

(73) Assignee: eBay Inc., San Jose, CA (US)

( * ) Notice: Subject to any disclaimer, the term of this patent is extended or adjusted under 35 U.S.C. 154(b) by 311 days.

(21) Appl. No.: 12/060,636

(22) Filed: Apr. 1, 2008

(65) Prior Publication Data

US 2008/0183489 A1    Jul. 31, 2008

Related U.S. Application Data

(63) Continuation of application No. 09/935,287, filed on Aug. 22, 2001, now Pat. No. 7,370,006, which is a continuation-in-part of application No. 09/427,958, filed on Oct. 27, 1999, now Pat. No. 7,373,317.

(60) Provisional application No. 60/313,615, filed on Aug. 20, 2001.

(51) Int. Cl.
G06Q 30/00    (2006.01)

(52) U.S. Cl. ...................................................... 705/26

(58) Field of Classification Search ................... 705/26, 705/27
See application file for complete search history.

(56) References Cited

U.S. PATENT DOCUMENTS

| | | |
|---|---|---|
| 4,613,946 A | 9/1986 | Forman |
| 4,799,154 A | 1/1989 | Matthews et al. |
| 4,799,156 A | 1/1989 | Shavit et al. |

(Continued)

FOREIGN PATENT DOCUMENTS

EP        0957437        11/1999

(Continued)

OTHER PUBLICATIONS

@Motshop.com Storefront Development Corporation, at Mothers' Online Thrift Shop (http://www.motshop.com) (excerpts printed Jun. 17, 2000-Jun. 19, 2000) 25.

(Continued)

*Primary Examiner*—Mila Airapetian
(74) *Attorney, Agent, or Firm*—Schwegman, Lundberg & Woessner, P.A.

(57) ABSTRACT

A method for using a telephone to list a seller's good for sale on a website including the steps of receiving good-identifying information from a seller via a telephone and presenting the good for sale on a website. The good-identifying information may be received as a series of tones generated by depression of keys of a telephone. The tones may optionally be used to navigate through a voice prompt system or to provide information about the good, such as the good's UPC code, ISBN number and/or characteristics of the good. The seller's provision of a standard identification code allows the marketeer to retrieve information relating to the good from a database and to use such information to present the good for sale. Such information, and/or the characteristics provided by the seller that are specific to the good may optionally be used to set or recommend a price for the good.

18 Claims, 4 Drawing Sheets

U.S. PATENT DOCUMENTS

| | | | |
|---|---|---|---|
| 4,996,642 A | | 2/1991 | Hey |
| 5,283,731 A | * | 2/1994 | Lalonde et al. ............ 705/1.1 |
| 5,310,997 A | | 5/1994 | Roach et al. |
| 5,583,763 A | | 12/1996 | Atcheson et al. |
| 5,592,375 A | | 1/1997 | Salmon et al. |
| 5,664,111 A | | 9/1997 | Nahan et al. |
| 5,715,402 A | | 2/1998 | Popolo |
| 5,732,400 A | | 3/1998 | Mandler et al. |
| 5,749,081 A | | 5/1998 | Whiteis |
| 5,790,426 A | | 8/1998 | Robinson |
| 5,790,790 A | | 8/1998 | Smith |
| 5,797,127 A | | 8/1998 | Walker et al. |
| 5,825,881 A | | 10/1998 | Colvin |
| 5,842,199 A | | 11/1998 | Miller et al. |
| 5,845,265 A | | 12/1998 | Woolston |
| 5,873,069 A | | 2/1999 | Reuhl et al. |
| 5,897,622 A | | 4/1999 | Blinn et al. |
| 5,918,213 A | | 6/1999 | Bernard et al. |
| 5,950,178 A | | 9/1999 | Borgato |
| 5,960,411 A | | 9/1999 | Hartman et al. |
| 6,012,045 A | | 1/2000 | Barzilai et al. |
| 6,016,475 A | | 1/2000 | Miller et al. |
| 6,016,504 A | | 1/2000 | Arnold et al. |
| 6,029,141 A | | 2/2000 | Bezos et al. |
| 6,041,311 A | | 3/2000 | Chislenko et al. |
| 6,047,264 A | | 4/2000 | Fisher et al. |
| 6,049,777 A | | 4/2000 | Sheena et al. |
| 6,055,513 A | | 4/2000 | Katz et al. |
| 6,061,448 A | | 5/2000 | Smith et al. |
| 6,061,488 A | | 5/2000 | Lhuillier et al. |
| 6,064,967 A | | 5/2000 | Speicher |
| 6,064,979 A | | 5/2000 | Perkowski |
| 6,064,980 A | | 5/2000 | Jacobi et al. |
| 6,076,070 A | | 6/2000 | Stack |
| 6,085,176 A | | 7/2000 | Woolston |
| 6,085,229 A | | 7/2000 | Newman et al. |
| 6,092,049 A | | 7/2000 | Chislenko et al. |
| 6,101,484 A | | 8/2000 | Halbert et al. |
| 6,101,486 A | | 8/2000 | Roberts et al. |
| 6,108,493 A | | 8/2000 | Miller et al. |
| 6,119,101 A | | 9/2000 | Peckover |
| 6,119,137 A | | 9/2000 | Smith et al. |
| 6,154,738 A | | 11/2000 | Call |
| 6,178,408 B1 | | 1/2001 | Copple et al. |
| 6,192,407 B1 | | 2/2001 | Smith et al. |
| 6,202,051 B1 | | 3/2001 | Woolston |
| 6,243,691 B1 | | 6/2001 | Fisher et al. |
| 6,246,997 B1 | | 6/2001 | Cybul et al. |
| 6,266,649 B1 | | 7/2001 | Linden et al. |
| 6,292,786 B1 | | 9/2001 | Deaton et al. |
| 6,308,168 B1 | | 10/2001 | Dovich et al. |
| 6,313,745 B1 | | 11/2001 | Suzuki |
| 6,317,722 B1 | | 11/2001 | Jacobi et al. |
| 6,321,221 B1 | | 11/2001 | Bieganski |
| 6,334,127 B1 | | 12/2001 | Bieganski et al. |
| 6,356,879 B2 | | 3/2002 | Aggarwal et al. |
| 6,370,513 B1 | | 4/2002 | Kolawa et al. |
| 6,412,012 B1 | | 6/2002 | Bieganski et al. |
| 6,415,263 B1 | | 7/2002 | Doss |
| 6,415,269 B1 | | 7/2002 | Dinwoodie |
| 6,418,441 B1 | | 7/2002 | Call |
| 6,484,149 B1 | | 11/2002 | Jammes et al. |
| 6,487,539 B1 | | 11/2002 | Aggarwal et al. |
| 6,502,080 B1 | | 12/2002 | Eichorst et al. |
| 6,606,607 B1 | | 8/2003 | Martin et al. |
| 6,615,247 B1 | | 9/2003 | Murphy |
| 6,625,581 B1 | | 9/2003 | Perkowski |
| 6,636,836 B1 | | 10/2003 | Pyo |
| 6,691,914 B2 | | 2/2004 | Isherwood et al. |
| 6,772,150 B1 | | 8/2004 | Whitman et al. |
| 6,785,671 B1 | | 8/2004 | Bailey et al. |
| 6,801,909 B2 | | 10/2004 | Delgado et al. |
| 6,813,775 B1 | | 11/2004 | Finseth et al. |
| 6,853,982 B2 | | 2/2005 | Smith et al. |
| 6,865,546 B1 | | 3/2005 | Song |
| 7,272,573 B2 | | 9/2007 | Childs et al. |
| 7,346,559 B2 | | 3/2008 | Reiner et al. |
| 2001/0021914 A1 | | 9/2001 | Jacobi et al. |
| 2001/0021921 A1 | | 9/2001 | Kan et al. |
| 2001/0037255 A1 | | 11/2001 | Tambay et al. |
| 2001/0037259 A1 | | 11/2001 | Sharma et al. |
| 2001/0056395 A1 | | 12/2001 | Khan |
| 2002/0022994 A1 | | 2/2002 | Miller et al. |
| 2002/0026386 A1 | | 2/2002 | Walden |
| 2002/0052873 A1 | | 5/2002 | Delgado et al. |
| 2002/0055890 A1 | | 5/2002 | Foley |
| 2002/0062268 A1 | | 5/2002 | Sato et al. |
| 2002/0065877 A1 | | 5/2002 | Kowtko et al. |
| 2002/0099629 A1 | | 7/2002 | Sato et al. |
| 2002/0103692 A1 | | 8/2002 | Rosenberg et al. |
| 2002/0138331 A1 | | 9/2002 | Hosea et al. |
| 2002/0143660 A1 | | 10/2002 | Himmel et al. |
| 2002/0147628 A1 | | 10/2002 | Specter et al. |
| 2002/0156686 A1 | | 10/2002 | Kraft et al. |
| 2002/0161664 A1 | | 10/2002 | Shaya et al. |
| 2002/0174428 A1 | | 11/2002 | Agnihotri et al. |
| 2002/0184116 A1 | | 12/2002 | Tam et al. |
| 2002/0198882 A1 | | 12/2002 | Linden et al. |
| 2003/0028427 A1 | | 2/2003 | Dutta et al. |
| 2003/0037041 A1 | | 2/2003 | Hertz |
| 2003/0051240 A1 | | 3/2003 | Schaffer et al. |
| 2003/0069740 A1 | | 4/2003 | Zeidman |
| 2003/0084450 A1 | | 5/2003 | Thurston et al. |
| 2003/0093331 A1 | | 5/2003 | Childs et al. |
| 2003/0093793 A1 | | 5/2003 | Gutta |
| 2003/0105682 A1 | | 6/2003 | Dicker et al. |
| 2003/0110056 A1 | | 6/2003 | Berghofer et al. |
| 2003/0131070 A1 | | 7/2003 | Stroebel et al. |
| 2003/0145326 A1 | | 7/2003 | Gutta et al. |
| 2003/0182249 A1 | | 9/2003 | Buczak |
| 2003/0208399 A1 | | 11/2003 | Basak et al. |
| 2003/0217332 A1 | | 11/2003 | Smith et al. |
| 2003/0233655 A1 | | 12/2003 | Gutta et al. |
| 2004/0039657 A1 | | 2/2004 | Behrens et al. |
| 2004/0078214 A1 | | 4/2004 | Speiser et al. |
| 2004/0143450 A1 | | 7/2004 | Vidali |
| 2004/0230499 A1 | | 11/2004 | Stack |
| 2004/0260621 A1 | | 12/2004 | Foster et al. |
| 2004/0267613 A1 | | 12/2004 | Chan et al. |
| 2005/0028207 A1 | | 2/2005 | Finseth et al. |
| 2005/0038717 A1 | | 2/2005 | McQueen et al. |
| 2005/0038733 A1 | | 2/2005 | Foster et al. |
| 2005/0055713 A1 | | 3/2005 | Lee et al. |

FOREIGN PATENT DOCUMENTS

| | | |
|---|---|---|
| GB | 1489572 | 10/1977 |
| WO | 9907121 | 11/1999 |
| WO | 0017792 | 3/2000 |
| WO | 0017793 | 3/2000 |
| WO | 0045319 | 8/2000 |
| WO | 0116848 | 3/2001 |
| WO | 0129726 | 4/2001 |
| WO | 0131537 | 5/2001 |
| WO | 0133401 | 5/2001 |
| WO | WO 0231537 A2 | 5/2001 |
| WO | 0219203 | 3/2002 |
| WO | 0229695 | 4/2002 |

WO 0237926 5/2002

OTHER PUBLICATIONS

Amazon, Amazon.com: Books [online] [Retrieved on Jul. 8, 2002] Retrieved from the Internet using <URL http://www.amazon.com/exec/obidos/tg/browse/-/283155/ref=tab_gw_b 3/102-9150031-1671331 (3 pp.).

Book Price, Book Price Compare.com-coupons and Discounts. [online] [Retrieved on Jul. 8, 2002] Retrieved from the internet using <URL http://www.bookpricecompare.com/bin/search.cgi?find=Compare&A_0618037667=1 (1 p.).

Books.com, "An exemplary online shopping agent with accessible at the item of filing of the above-identified application," Via the Internet URL http://www.books.com. (Mar. 3, 2000).

Ebay, eBay Listings: Action & Adventure. [online] [Retrieved on Jul. 8, 2002] Retrieved from the Internet using <URL http://listingsebay.com/aw/plistings/list/allcategory271/index.html?ssPageName=bookhubactionadventure (4 pp.).

Iacobucci, et al., "Recommendation agents on the Internet," Journal of Interactive Marketing, v14n3, Jul. 1, 2000 pp. 2-11 (Jan. 7, 2000).

Kumar, et al., "Recommendation Systems," A probabilistic analysis, J. Computer Systems Science, vol. 63, No. 1 Aug. 2001, pp. 42-61.

McDonald, D. et al., "Expertise Recommender," A Flexible Recommendation System and Architecture, Department of Information and Computer Science, 10 pp.

Priceline, Priceline.com—Name your own price and save on airline tickets, hotel rooms, new cars, home mortgages . . . [online] [Retrieved on Jul. 8, 2002] Retrieved from the Internet using <URL http://www.priceline.com/customerservice/faq/howits/howitworks.asp?session_key=D10011AC230011. (2pp.).

Schafer, J B. et al., " E-Commerce Recommendation Applications," GroupLens Research Project Dept. of Computer Science & Engineering, University of Minnesota, Minneapolis, MN 55455 pp. 1-24.

"U.S. Appl. No. 09/427,958, Advisory Action mailed May 10, 2005", 2 pgs.

"U.S. Appl. No. 09/427,958, Advisory Action mailed Jun. 21, 2006", 5 pgs.

"U.S. Appl. No. 09/427,958, Final Office Action mailed Mar. 14, 2006", 14 pgs.

"U.S. Appl. No. 09/427,958, Final Office Action mailed Jun. 1, 2007", 14 pgs.

"U.S. Appl. No. 09/427,958, Non Final Office Action mailed Feb. 20, 2002", 8 pgs.

"U.S. Appl. No. 09/427,958, Non Final Office Action mailed Mar. 10, 2005", 17 pgs.

"U.S. Appl. No. 09/427,958, Non Final Office Action mailed Sep. 6, 2005", 12 pgs.

"U.S. Appl. No. 09/427,958, Non Final Office Action mailed Sep. 15, 2006", 13 pgs.

"U.S. Appl. No. 09/427,958, Notice of Allowance mailed Jan. 18, 2008", 5 pgs.

"U.S. Appl. No. 09/427,958, Preliminary Amendment filed Oct. 27, 1999", 2 pgs.

"U.S. Appl. No. 09/427,958, Response filed Jan. 6, 2006 to Non Final Office Action mailed Sep. 6, 2005", 26 pgs.

"U.S. Appl. No. 09/427,958, Response filed Jan. 17, 2007 to Non Final Office Action mailed Sep. 15, 2006", 22 pgs.

"U.S. Appl. No. 09/427,958, Response filed Mar. 11, 2003 to Restriction Requirement mailed Feb. 11, 2003", 3 pgs.

"U.S. Appl. No. 09/427,958, Response filed Apr. 28, 2005 to Non Final Office Action mailed Mar. 10, 2005", 19 pgs.

"U.S. Appl. No. 09/427,958, Response filed Jun. 14, 2006 to Final Office Action mailed Mar. 14, 2006", 27 pgs.

"U.S. Appl. No. 09/427,958, Response filed Jul. 22, 2002 to Non Final Office Action mailed Feb. 20, 2002", 39 pgs.

"U.S. Appl. No. 09/427,958, Response filed Oct. 30, 2007 to Final Office Action mailed Jun. 1, 2007", 28 pgs.

"U.S. Appl. No. 09/427,958, Restriction Requirement mailed Feb. 11, 2003", 5 pgs.

"U.S. Appl. No. 09/935,287, Appeal Brief filed Jan. 9, 2006", 28 pgs.

"U.S. Appl. No. 09/935,287, Final Office Action mailed Jul. 27, 2005", 11 pgs.

"U.S. Appl. No. 09/935,287, Non Final Office Action mailed Feb. 11, 2005", 17 pgs.

"U.S. Appl. No. 09/935,287, Notice of Allowance mailed Dec. 20, 2007", 4 pgs.

"U.S. Appl. No. 09/935,287, Pre-Appeal Brief Request filed Sep. 27, 2005", 5 pgs.

"U.S. Appl. No. 09/935,287, Preliminary Amendment filed Aug. 7, 2002", 3 pgs.

"U.S. Appl. No. 09/935,287, Reply Brief filed Jun. 5, 2006", 8 pgs.

"U.S. Appl. No. 09/935,287, Response filed May 11, 2005 to Non Final Office Action mailed Feb. 11, 2005", 19 pgs.

"U.S. Appl. No. 09/935,287, Response filed Jun. 11, 2007 to Non Final Office Action mailed May 18, 2007", 8 pgs.

"U.S. Appl. No. 09/935,287, Response filed Sep. 7, 2004 to Restriction Requirement mailed Aug. 9, 2004", 2 pgs.

"U.S. Appl. No. 09/935,287, Restriction Requirement mailed Aug. 9, 2004", 5 pgs.

"U.S. Appl. No. 10/200,908, Advisory Action mailed Aug. 27, 2004", 6 pgs.

"U.S. Appl. No. 10/200,908, Final Office Action mailed Feb. 26, 2004", 13 pgs.

"U.S. Appl. No. 10/200,908, Non Final Office Action mailed Oct. 8, 2003", 13 pgs.

"U.S. Appl. No. 10/200,908, Response filed Jan. 8, 2004 to Non Final Office Action mailed Oct. 8, 2003", 20 pgs.

"U.S. Appl. No. 10/200,908, Response filed Jun. 24, 2004 to Final Office Action mailed Feb. 26, 2004", 21 pgs.

"U.S. Appl. No. 10/743,982, Advisory Action mailed Jan. 23, 2007", 2 pgs.

"U.S. Appl. No. 10/743,982, Final Office Action mailed Aug. 11, 2006", 9 pgs.

"U.S. Appl. No. 10/743,982, Non Final Office Action mailed Feb. 28, 2006", 6 pgs.

"U.S. Appl. No. 10/743,982, Notice of Allowance mailed Jul. 6, 2007", 7 pgs.

"U.S. Appl. No. 10/743,982, Response filed Jan. 11, 2007 to Final Office Action mailed Aug. 11, 2006", 15 pgs.

"U.S. Appl. No. 10/743,982, Response filed May 30, 2006 to Non Final Office Action mailed Feb. 28, 2006", 17 pgs.

"U.S. Appl. No. 10/743,982, Response filed Aug. 16, 2005 to Restriction Requirement Jul. 22, 2005", 5 pgs.

"U.S. Appl. No. 10/743,982, Restriction Requirement mailed Jul. 22, 2005", 5 pgs.

"U.S. Appl. No. 10/743,988, Final Office Action mailed May 28, 2009", 13 pgs.

"U.S. Appl. No. 10/743,988, Non Final Office Action mailed Oct. 1, 2008", 9 pgs.

"U.S. Appl. No. 10/743,988, Non-Final Office Action mailed Feb. 1, 2010", 14 pgs.

"U.S. Appl. No. 10/743,988, Response filed Feb. 2, 2009 to Non Final Office Action mailed Oct. 1, 2008", 18 pgs.

"U.S. Appl. No. 10/743,988, Response filed Apr. 28, 2010 to Non Final Office Action mailed Feb. 1, 2010", 16 pgs.

"U.S. Appl. No. 10/743,988, Response filed Oct. 28, 2009 to Final Office Action mailed May 28, 2009", 15 pgs.

"U.S. Appl. No. 11/767,078, Preliminary Amendment filed Jun. 22, 2007", 6 pgs.

"Method for Buying and Selling Merchandise in a Network of Users". *Excerpt of Document titled "Method for Buying and Selling Merchandise in a Network of Users", a document alleged to have been filed as a patent application around Jun. of 1999*, 17 pgs.

Amazon, "An exemplary online retail seller was accessible at the time of filing of the above-identified application", [Online]. [Archived Mar. 3, 2000] Retrieved from the Internet: <URL: http://web.archive.org/web/20000303173713/www.amazon.com/exec/obidos/subst/home/home.html>, 2 pgs.

Andale Gallery, "Andale", www.andale.com/corp/products/gallery.jsp, (Printed May 21, 2002).

Andale Gallery, "Gallery—Cross Sell More Items", [Online]. Retrieved from the Internet: <URL: http://cms.andale.com/corp/products/gallery.jsp (also http://cms.andale.com/auction/gallery.html)> Accessed on Web Apr. 15, 2005, (Copyright 1999-2005), Web Page.

Andale Gallery, "Prominently Featured on Your Listings", [Online]. Retrieved from the Internet: <URL: http://www.andale.com/corp/tour/gal_tour4.html> Accessed on Web—Apr. 15, 2005, (Copyright 2001), Web Page.

Ansari, A., "Internet Recommendation System", *Journal of Marketing Research*, vol. 37(3), Proquest #57914570, (Aug. 2000), 363.

Ardissono, Liliana, et al., "Tailoring the Interaction With Users in Electronic Shops", *Proceedings of the Seventh International Conference on User Modeling*, Banff, Canada, (1999), 35-44.

Balabanovic, Marko, "An Adaptive Web Page Recommendation Service", *Stanford University Digital Libraries Project Working Paper*, Proceedings of the First International Conference on Autonomous Agents, (1999), 378-385.

Breese, John S, et al., "Empirical Analysis of Predictive Algorithms for Collaborative Filtering", *Technical Report MSR-TR-98-12—Microsoft Research*, (May 1998—Revised Oct. 1998), 1-21.

Burke, Robin, "The Wasabi Personal Shopper: a case-based recommender system", *Proceedings of the Sixteenth National Conference on Artificial Intelligence and the Eleventh Innovative Applications of Artificial Intelligence Conference Innovative Applications of Artificial Intelligence*, (1999), 844-849.

eBay, "An exemplary online at the time of listing of the above-identified application", [Online]. [Archived Mar. 3, 2000) Retrieved from the Internet: <http://web.archive.org/web/20000303033857/www.ebay.com/>, 1 pg.

eBizAutos, "Better Presentations. Better Results on eBay Motors.", *eBizAutos—eBay Motors Auction Management System for Auto & Motorcysle Dealers*, www.ebizautos.com, (Printed May 21, 2002), 1 page.

eBizAutos, "eBay Motors Auction Management System for Auto & Motorcycle Dealers", [Online]. Retrieved from the Internet: <URL: http://www.ebizautos.com/>, (Copyright 2001-2005), Web Page.

Greco, Carl, "What you should know before joining an Internet Mall", *Direct Marketing*, 61(10), (Feb. 1999), 42-3.

Harvey, L, ""On Birthdays" mortgages, ice cream sundaes, personalization and cross selling tools provide cross-selling Strategies & Solutions, (Jul. 1999), 31-5 and term life. How in the enterprise", E-business.

IBM, "WebSphere Commerce Professional Edition", *Features at Glance*, www-3.ibm.com/software/webservers/commerce/wc_pe/morefeatures.html, (Printed May 21, 2002), 1 page.

Maes, Pattie, et al., "Agents that Buy and Sell", *Communications of the ACM* 42(3), (Mar. 1999), 81-91.

Maes, Pattie, et al., "Agents that Buy and Sell:", *Transforming Commerce as we Know it*, 1998 MIT Media Laboratory. Submitted to the Communications of the ACM, Mar. 1999 Issue, (1998), 12 pgs.

Nextag, "Computer Letter, Private Profiles—NexTag—Of all the auction sites on the Web, here's one an economist might like", [Online]. Retrieved from the Internet: <URL: http://www.nextag.com/serv/main/about/computer/letter.html>, (Aug. 23, 1999).

Priceline.Com, "An exemplary online reverse-auction was accessible at the time of filing of the above-identified application", [Online]. [Archived Mar. 3, 2000] Retrieved from the Internet: <URL: http://web.archive.org/web/20000303112236/http://www.priceline.com/>, 1 pg.

Roe, Andy, "Amazon Adds Seller Services", Accessed through following address—http://web.archive.org/web/20000816024400/http://www.auctionwatch.com/awdaily/dailynews/august99/3-081899.html, (Aug. 18, 1999), Web Page.

Websphere, "WebSphere Commerce Professional Edition—Features", [Online]. Retrieved from the Internet: <URL: http://www-306.ibm.com/software/genservers/commerce/wcpe/>, (Downloaded Apr. 21, 2005), Webpage.

"U.S. Appl. No. 10/743,988 Non-Final Office Action mailed Jul. 22, 2010", 11 pgs.

"U.S. Appl. No. 11/767,078 Non-Final Office Action mailed Jul. 12, 2010", 8 pgs.

* cited by examiner

METHOD AND APPARATUS FOR LISTING GOODS FOR SALE

RELATED APPLICATIONS

This application is a continuation-in-part of U.S. application Ser. No. 09/427,958, filed Oct. 27, 1999, now U.S. Pat. No. 7,373,317, and this application claims the benefit of U.S. Provisional patent application No. 60/313,615, titled "Method and Apparatus for Listing Goods for Sale", filed Aug. 20, 2001, the disclosures of both of which are hereby incorporated herein by reference.

FIELD OF THE INVENTION

This invention relates generally to the field of sales of goods and particularly to a method and apparatus for using a telephone to list goods for sale in electronic commerce applications.

BACKGROUND OF THE INVENTION

The industrial age has given rise to a global economy of factories engaged in mass production of various goods. An enormous amount of commerce is transacted in the buying and selling of such goods. While some such goods lose their value with use, e.g., food products, many such goods retain a substantial portion of their value even after use or ownership by another. Such goods are referred to herein as "durable". A considerable amount of commerce is transacted in the buying and selling of durable goods, particularly used durable goods.

Almost all durable goods are readily identifiable by a standard product identification code ("ID code") that uniquely identifies the good, particularly those that are mass produced. In the case of computer software, music cassettes or compact discs, videocassettes and digital video discs, the ID code may be a human readable Universal Product Code ("UPC"), a thirteen digit ID code that is widely used to readily identify the good. In the case of books, magazines or other publications, the ID code may be a human readable ten-digit International Standard Book Number ("ISBN"). Other items are more readily identified by a manufacturer or brand name and a model number, as for baseball cards and consumer electronics, e.g., a Sony® KV-3620 television. Some goods may be identifiable by more than one type of ID code.

U.S. application Ser. No. 09/427,958, now U.S. Pat. No. 7,373,317, discloses a method and apparatus for facilitating sales of goods, particularly, used durable goods, by independent parties. In addition, U.S. application Ser. No. 09/427,958, now U.S. Pat. No. 7,373,317, discloses a method for pricing such goods for sale which exploits the fungible and readily identifiable nature of such goods, e.g., by allowing a seller to list a good for sale by identifying it by a product identification code that is affixed to the good and/or its packaging.

Such a method is particularly convenient for sellers of a single item or items which may be easily transported to a computer station so that the seller may read the product identification code from the item and use the computer to enter the product identification code and list the good for sale. The good may be listed for sale by using the computer to transmit the product identification code and related information to the marketplace, e.g., website. Alternatively, the product identification code and/or related information may be transmitted to the entity controlling the marketplace, referred to herein as the marketeer. However, such a method is inadequate for items stored in locations remote from a computer and are not easily transported, e.g., for large items or items stored in large quantities.

Telephone based interfaces for interacting with websites are known. For example, Tellme Networks, Inc. of Mountain View, Calif. (URL http://www.tellme.com) has developed a voice-based telephone interface by which users can use certain voice commands to hear information in selected categories that Tellme Networks, Inc. retrieves from the Web and transforms into audio signals. Audium Corp. (formerly Phone2Networks, Inc.) of New York, N.Y. has developed interfaces for using a telephone, rather than a computer, to interact with a website and/or the Internet. For example, Audium Corp. offers services including Phone2Bid to track and bid on an online auction, Phone2Compare (formerly Phone2Books) to get the real time prices from online vendors, and Phone2Quotes to get custom stock portfolio updates. Information regarding these services was available on the World Wide Web at the time of filing of this application at URL http://www.audiumcorp.com/products/

SUMMARY OF THE INVENTION

The invention provides a method for using a telephone to list a seller's good for sale on a website. In one embodiment, the method includes the steps of receiving good-identifying information from a seller via a telephone, retrieving information relating to the good from a database, and using the retrieved information to present the good for sale on a website.

In another embodiment, the method includes the steps of receiving good-identifying information from a seller via a telephone in the form of a series of tones generated by depression of keys of a telephone, and subsequently presenting the good for sale on a website. The tones may optionally be used to navigate through a voice prompt system or to provide information about the good, such as the good's UPC code, ISBN number and/or characteristics of the good, such as the good's "like new" or "poor" condition. The seller's provision of a standard identification code allows the marketeer to retrieve information relating to the good from a database and use such information to present the good for sale. Such information, and/or the characteristics provided by the seller that are specific to the good, may optionally be used to set or recommend a sale price for the good.

In accordance with the present invention, a seller may list goods for sale on a website without the need for a computer, making it convenient to list goods for sale from a location where no computer is present, such as a warehouse, garage, attic, or basement, but where a telephone is accessible or may be used.

DETAILED DESCRIPTION

Websites providing a computer-based, i.e., Web, interface for listing goods for sale on a website are known. Examples of such websites include a marketplace accessible via the Internet at URL http://www.half com, maintained by Half.com Inc. of Plymouth Meeting, Pa., and an auction-based website accessible via the Internet at URL http://www.ebay.com maintained by eBay Inc. of San Jose, Calif.

The present invention provides a method for listing goods for sale on a website using a telephone, such as a cordless or cellular telephone. Information that could be communicated between the seller and the marketeer using a Web-based interface is communicated to the marketeer via telephone, which makes it easier for the seller to provide such information from locations in which a computer for accessing the Web-based interface is not available. For example, a wireless telephone could be used in an attic of a garage where goods are stored but where no computer is available for accessing a Web-based interface.

Figure 1:
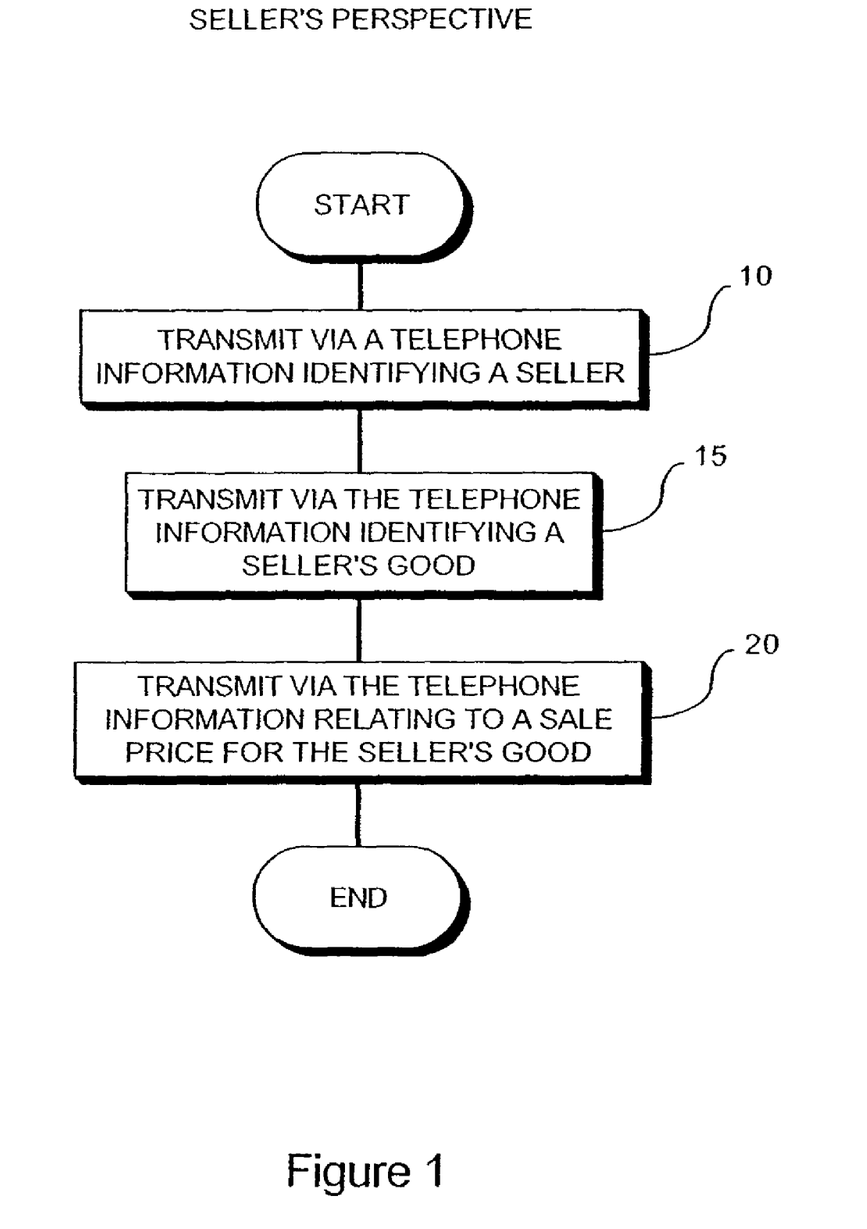
FIG. 1 is a flow diagram of an exemplary transaction in accordance with one embodiment of the present invention, shown from a seller's perspective.

FIG. 1 is a flow diagram of an exemplary transaction in accordance with one embodiment of the present invention, shown from a seller's perspective. As shown in FIG. 1, the seller first transmits via a telephone information identifying the seller to the marketeer, as shown at step 10. The seller may do so affirmatively, for example, by dialing a designated telephone number of the marketeer using a telephone and, when prompted to do so, depressing the keys of the telephone in a sequence corresponding to an alphanumeric sequence of a seller's identification code, account code and/or personal identification number (PIN), e.g. as assigned by the marketeer and/or as previously selected by the seller. As used herein, "alphanumeric sequence" refers to a sequence including letters, numbers, and/or other symbols. The depression of the keys causes the telephone to generate a series of tones, i.e., pulses for a pushbutton rotary phone, or dual-tone multifrequency (DTMF) tones for a touch tone telephone, as is well known in the art. These tones are recognizable by the marketeer's equipment, which translates the tones into a seller identification code, which is recognizable by the marketeer to identify the seller or an account of the seller or an account to be used by the seller. The seller identification code may be assigned by the marketeer or selected by the seller. Equipment for recognizing such tones are well known in the art. Alternatively, the seller may transmit such information passively. For example, the telephone number of the telephone used by the seller may be recognized using a caller identification technique function, as is well known in the art, and that telephone number may be used to identify the seller. This information may be used by the marketeer to identify an account and/or other seller information previously provided to the marketeer, e.g., the seller's name, address, etc.

The seller then transmits via the telephone information identifying the good to be offered for sale, as shown at step 15. In one embodiment, the seller may provide such information by using the telephone's keys to navigate through a voice prompt system. For example, the seller may be provided with voice prompts to assist the seller to identify his good, e.g., "Press 1 for books, 2 for music, 3 for videos . . . ", etc. Voice-prompt telephone systems are well known in the art. In the preferred embodiment, the seller is instructed to depress the keys of a telephone to provide a standard identification code which uniquely identifies the good, such as a UPC code or ISBN number. In another embodiment, the seller may speak letters and/or numbers of the identification code. In such an embodiment, the marketeer may use equipment having speech recognition software for recognizing the seller's speech and translating it into electronic data.

The seller then transmits via the telephone information relating to a sale price for the seller's good, as shown at step 20. For example, the seller may use the telephone's keys to select a sale price from a menu of sale prices, e.g., "Press 1 for $5, 2 for $10 . . . ", etc. Alternatively, the seller may use the telephone's keys to enter a sale price for the seller's good, e.g., $7 by pressing the 7 key. In the preferred embodiment, the seller is also provided opportunities, during the same and/or subsequent calling sessions, to revoke and/or modify the listing of the good, e.g., the condition, the selling price, etc. Thus, an independent seller may use a telephone to list the seller's good for sale on the marketeer's website.

Figure 2:
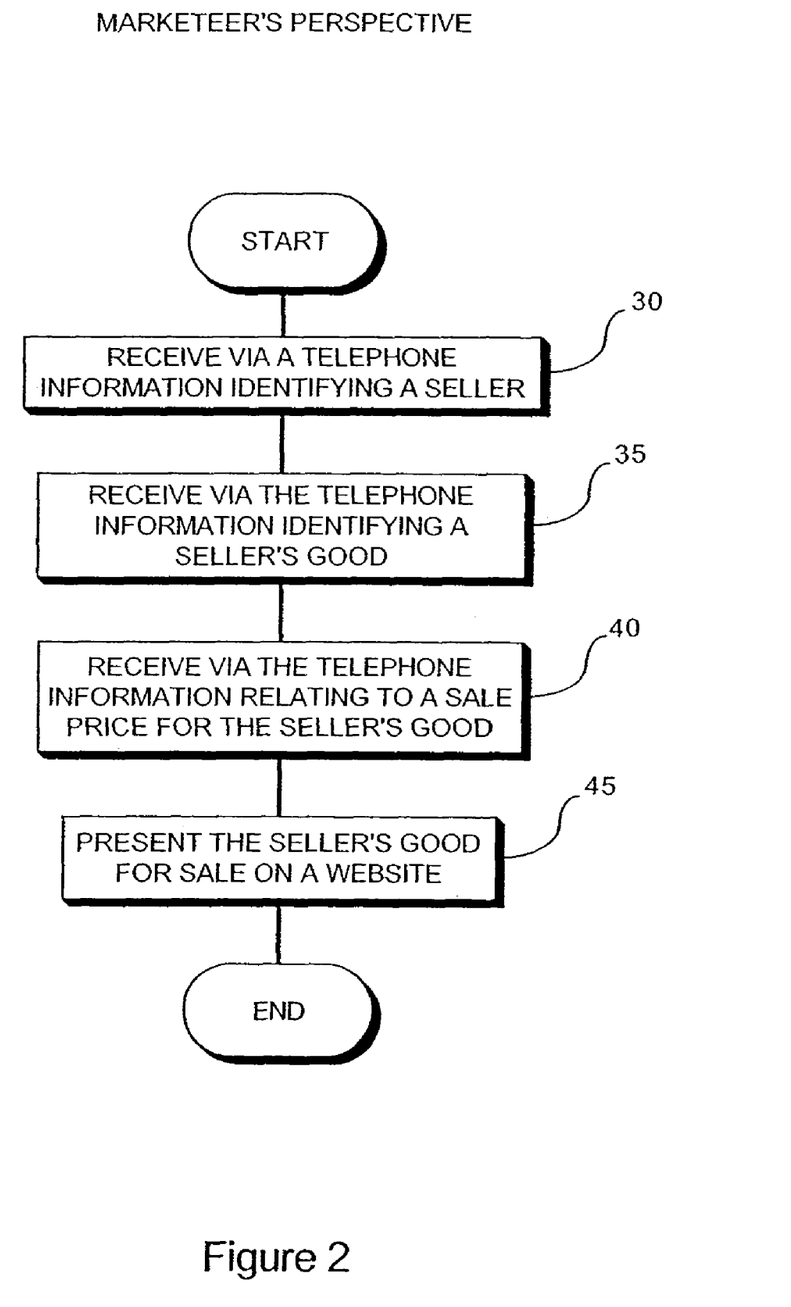
FIG. 2 is a flow diagram of the exemplary transaction of FIG. 1, shown from a marketeer's perspective.

FIG. 2 is a flow diagram of the exemplary transaction of FIG. 1, shown from a marketeer's perspective. As shown in FIG. 2, the marketeer first receives via a telephone information identifying a seller, as shown at step 30 and described above. Information identifying the seller's good is then received via the telephone, as shown at step 35 and described above. The marketeer then receives information relating to a sale price for the seller's good, as shown at step 40. Such information may include a price set by the seller, or information for determining a price recommended or set by the marketeer.

As shown in step 45, the marketeer presents the seller's good for sale on a website, e.g. the marketeer's website, using the information provided by the seller. Methods and apparatuses for presenting a good for sale on a website are well known. For example, the marketeer may add the information provided by the seller to its database of goods for sale. The good need not be displayed on the website. Rather, if a buyer later wishes to buy the good and makes an inquiry to the marketeer, the marketeer provides the potential buyer with the information provided by the seller and/or other information about the seller's good which the marketeer may retrieve from a database of information using the information provided by the seller, e.g., cover art, descriptions, title, author, reviews, etc. for a book identified by the seller, or cover art, description, title, artist, song list, etc. for a music compact disc identified by the seller.

Figure 3:
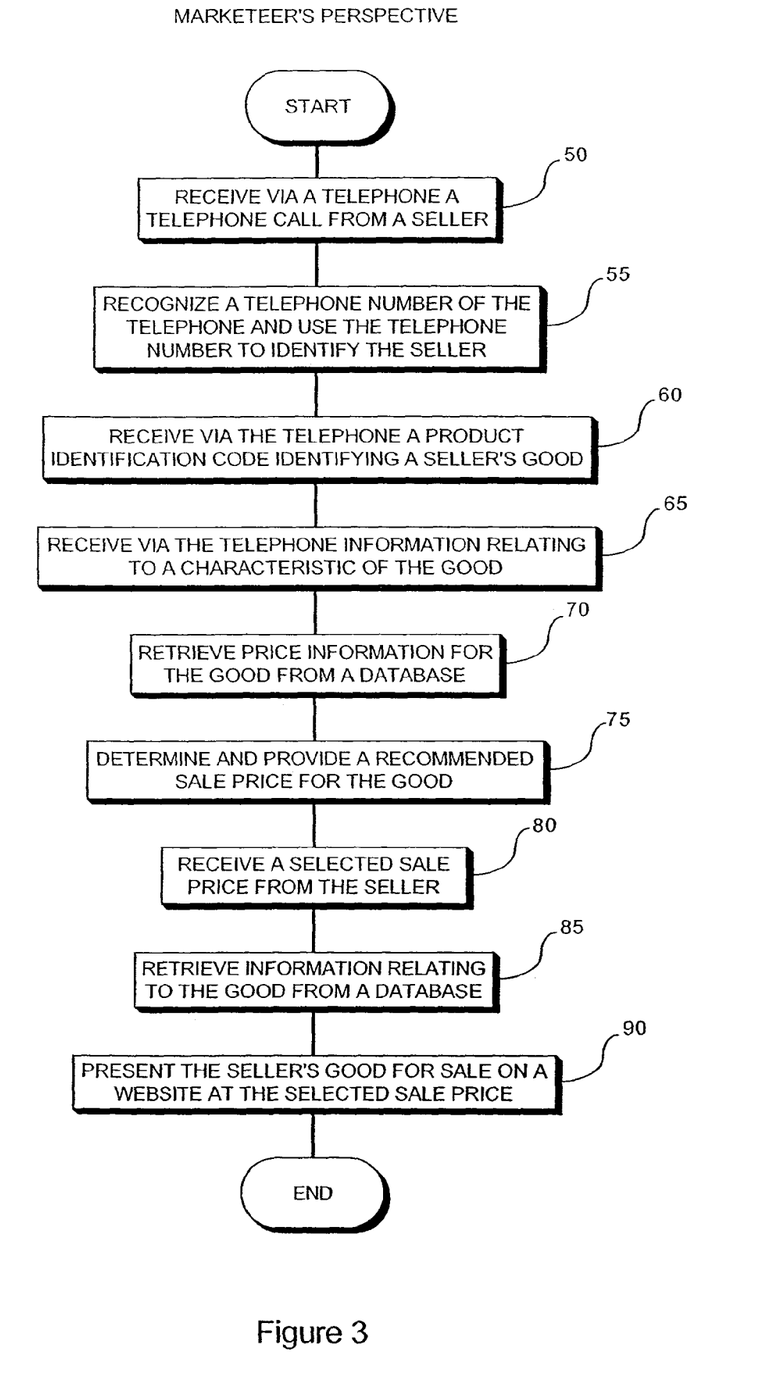
FIG. 3 is a flow diagram of an exemplary transaction in accordance with an alternate embodiment of the present invention, shown from a marketeer's perspective.

FIG. 3 is a flow diagram of an exemplary transaction in accordance with an alternate embodiment of the present invention, shown from a marketeer's perspective. In this embodiment, the marketeer first receives a telephone call from the seller, as shown at step 50. The marketeer then recognizes a telephone number of the telephone used by the seller and references a database of seller information to determine an identity of the seller associated with the telephone number, as shown at step 55. In one embodiment, the seller is prompted to enter a personal identification number (PIN) to verify that the seller has permission to use the account identified. The marketeer preferably provides a message prompting the seller to enter a standard product identification code identifying the good, such as a UPC or ISBN code using the keys of the seller's telephone. The seller then provides such information by depressing an appropriate sequence of keys of the telephone and the marketeer receives such information, as shown at step 60.

The marketeer also provides a message prompting the seller to transmit information relating to a characteristic of the good, e.g., those characteristics that are specific to the seller's good and cannot be discerned from the standard product identification code. For example, the characteristic may be a condition of the good, e.g., that the good is in new, very good, fair or poor condition. The seller provides such information by depressing appropriate telephone keys, e.g., "Press 1 for a good in "like new" condition, press 2 for a good in "very good" condition . . . ", etc. and the marketeer receives such information, as shown at step 65.

In the embodiment of FIG. 3, the marketeer uses the product identification code to retrieve price information for a comparable good, e.g., a new good, from a database of price information, as shown at step 70. The marketeer then uses the characteristic information provided in step 65 to calculate a recommended price for the seller's good, e.g., a used good in "like new" condition may be priced at a discount of 50% from the price for a comparable new good. In one embodiment, the marketeer may also specify a maximum allowable price using a marketeer-specified method, e.g., no more than half of a manufacturer's suggested retail price of a similar, new good. The marketeer then provides the recommended sale price to the seller, e.g., by a voice message transmitted via the seller's telephone, as shown at step 75. The seller is presented with options to select the recommended sale price by depressing a key to confirm, or to alternatively use the telephone's keys to enter a selected sale price, as shown at step 80. The seller's identity, the product identification code for the seller's good, and related characteristic and/or price information is stored by the marketeer and the good is added to the marketeer's virtual inventory of goods for sale. The inventory is "virtual" in that the marketeer need not take possession of the good to have it in its inventory. Rather, the identification, or "listing", of the seller's good in the marketeer's database of sale items is sufficient to place the good in the marketeer's virtual inventory. In this manner, a buyer may find the good when browsing the marketeer's website.

Additionally, the product identification code may be used to retrieve information relating to the good from a database of information, e.g., cover art, critics or buyers' reviews of a book, a song list for a compact disk, etc., as shown at step 85 and discussed above. This information may be displayed on the marketeer's website to present the good for sale, as shown at step 90, e.g., after a buyer inquires about the good. For example, a buyer may browse the website, search for a book by author, and once the book is found by the marketeer and selected by the buyer, the product identification code for the book is checked against the marketeer's virtual inventory, the seller's listing of the book is found, and the cover art and book review from the database of related information is displayed along with the seller-provided condition of the good and selected sale price. In this alternate manner, the seller's good is presented for sale on the marketeer's website.

The information transmitted by the seller and received by the marketeer may advantageously be received by automated systems, e.g., computers, i.e., Web servers, in real time. In this manner, the marketeer's website is updated and the seller's good is presented for sale, in real time, i.e., almost instantaneously.

In this manner, sellers may list goods for sale on a website without the need for a computer-based interface to list good for sale. The method therefore provides sellers with an opportunity to list goods for sale using a wireless telephone, e.g., from a location where a computer for accessing a website is not available, such as a warehouse, basement, attic, garage, or other location.

Figure 4:
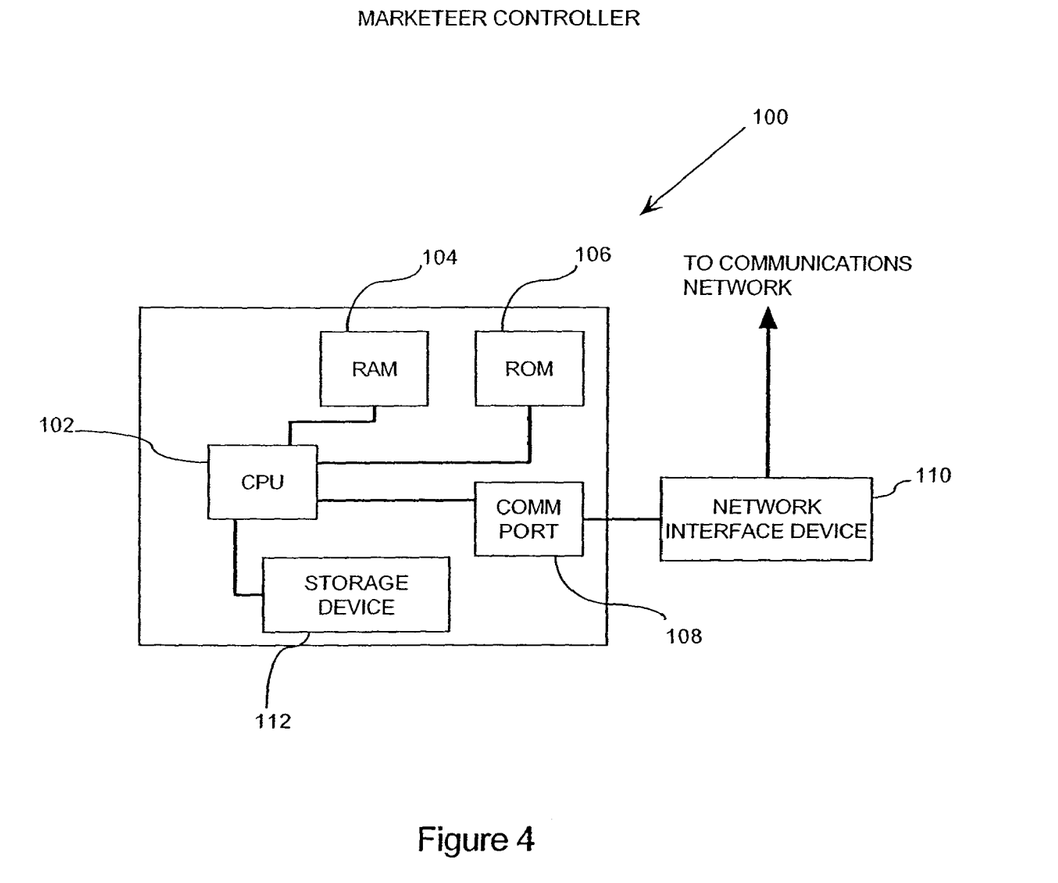
FIG. 4 is a block diagram of a marketeer controller in accordance with the present invention.

FIG. 4 is a block diagram of a marketeer controller 100 in accordance with the present invention. The marketeer controller includes a central processing unit ("CPU") 102, random access memory ("RAM") 104, read only memory ("ROM") 106, and a communications port ("COMM PORT") 108 connected to a network interface device 110 for communicating over a communications network. The marketeer controller 100 also includes a storage memory including a storage device 112 for storing data including a first program a first program for receiving via a telephone information relating to a seller's good, a second program for storing electronic data relating to a seller's good, and a third program for presenting the seller's good for sale on a website. The marketeer controller may optionally include a video driver (not shown) and may optionally be connected to a video monitor (not shown) and or an input device (not shown), such as a mouse or keyboard.

In one embodiment, the information received by said the program is configured to recognize a series of tones generated by depression of keys of a telephone. In another embodiment, the marketeer controller includes a fourth program for recognizing speech in embodiments in which the information received by the first program is a spoken voice signal of the seller. Optionally, the marketeer controller may include a fifth program for retrieving information relating to the good from a database. In such an embodiment, the information retrieved by the fifth program may be used by the third program to present the seller's good for sale on the website.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A computer-implemented method for listing an independent seller's good for sale using a CPU, a memory operatively connected to the CPU and a program stored in the memory and executable by the CPU for presenting the good for sale on a website, the method comprising:

(a) receiving from a seller information identifying a good, the information comprising a series of tones, generated by selection of keys of a touch tone telephone, in a sequence corresponding to an alphanumeric sequence of a good-identifying code; and (b) presenting the good for sale on the website.

2. The method of claim 1, wherein the series of tones navigates through a voice-prompt system.

3. The method of claim 1, wherein the good-identifying code is a standard identification code.

4. The method of claim 3, wherein the standard identification code is a universal product code.

5. The method of claim 3, wherein the standard identification code is an international standard book number.

6. The method of claim 1, further comprising the operation of: (c) retrieving information relating to the good from a database; wherein the information retrieved in operation (c) is used to present the good for sale in operation (b).

7. The method of claim 6, wherein operation (b) is performed in real time.

8. The method of claim 1, wherein the information identifying the good identifies a characteristic of the good in addition to an identity of the good.

9. The method of claim 6, further comprising the operations of: (d) determining a recommended sale price for the good; (e) providing the recommended sale price to the seller; and (f) receiving from the seller a selected sale price.

10. The method of claim 6, further comprising the operations of: (g) determining a recommended sale price for the good; (h) providing the recommended sale price to the seller; and (i) receiving from the seller a confirmation of the seller's acceptance of the recommended sale price and using the recommended sale price as the selected sale price.

11. The method of claim 1, further comprising the operation of: (j) receiving a seller identification code which is recognizable in association with the seller.

12. The method of claim 11, wherein the seller identification code received in operation (j) comprises tones generated by depressing the telephone's keys in a sequence corresponding to an alphanumeric sequence associated with the seller.

13. The method of claim 11, wherein the seller identification code is a telephone number of the telephone from which the seller is calling, and wherein operation (g) comprises recognizing the telephone's telephone number by a caller identification technique.

14. A marketeer controller to receive from a seller information relating to a seller's good and for listing the good for sale on a website, the marketeer controller comprising:

a central processing unit;

a memory operatively connected to said central processing unit;

a first program stored in said memory and executable by said central processing unit for receiving via a telephone information relating to a seller's good, the telephone information received by the first program comprises a series of tones generated by selection of keys of a telephone and the series of tones comprising tones generated by the selection of the keys of the touch tone telephone in a sequence corresponding to an alphanumeric sequence of good-identifying code;

a second program stored in said memory and executable by said central processing unit for storing electronic data relating to a seller's good; and a third program stored in said memory and executable by said central processing unit for presenting the seller's good for sale on a website.

15. The marketeer controller of claim 14, further comprising a fourth program stored in said memory and executable by said central processing unit for recognizing speech, wherein the information received by said first program comprises a voice signal of the seller.

16. The marketeer controller of claim 14, further comprising a fifth program stored in said memory and executable by said central processing unit for retrieving information relating to the good from a database, the information being used by said third program to present the seller's good for sale on the website.

17. A method for listing a seller's good for sale on a website, the method comprising operations:

receiving from a seller information identifying a good, the information being transmitted via a telephone and comprising a series of tones, generated by selection of keys of a touch tone telephone, in a sequence corresponding to an alphanumeric sequence of good-identifying code;

retrieving from a database information relating to the good; and presenting the good for sale on a website using the information retrieved from the database.

18. The method of claim 17, wherein the information transmitted in operation (a) comprises a voice signal.

* * * * *

UNITED STATES PATENT AND TRADEMARK OFFICE
CERTIFICATE OF CORRECTION

| | | |
|---|---|---|
| PATENT NO. | : 7,813,967 B2 | |
| APPLICATION NO. | : 12/060636 | |
| DATED | : October 12, 2010 | |
| INVENTOR(S) | : Srinivas Balijepalli, Joshua Kopelman and Christopher Fralic | |

It is certified that error appears in the above-identified patent and that said Letters Patent is hereby corrected as shown below:

On the Title page item (75), Inventors, column 1, line 1, Delete "R" and insert -- M. --, therefor.

On page 4, Other Publications, column 1, line 28, Delete "Motorcysle" and insert -- Motorcycle --, therefor.

On page 4, Other Publications, column 2, line 1-4, Delete "Harvey, L, ""On Birthdays" mortgages, ice cream sundaes, personalization and cross selling tools provide cross-selling Strategies & Solutions, (Jul. 1999), 31-5 and term life. How in the enterprise", E-business." and
insert -- Harvey, L, ""On Birthdays" mortgages, ice cream sundaes, and term life. How personalization and cross selling tools provide cross-selling in the enterprise", E-business Strategies & Solutions, (Jul. 1999), 31-5. --, therefor.

In column 1, line 5-12, delete "This application is a continuation-in-part of U.S. application Ser. No. 09/427,958, filed Oct. 27, 1999, now U.S. Pat. No. 7,373,317, and this application claims the benefit of U.S. Provisional patent application No. 60/313,615, titled "Method and Apparatus for Listing Goods for Sale", filed Aug. 20, 2001, the disclosures of both of which are hereby incorporated herein by reference."
and
insert -- This application is a continuation of U.S. application Ser. No. 09/935,287, filed Aug. 22, 2001, now U.S. Pat. No. 7,370,006, which is a continuation-in-part of U.S. application Ser. No. 09/427,958, filed Oct. 27, 1999, now U.S. Pat. No. 7,373,317, and this application claims the benefit of U.S. Provisional patent application No. 60/313,615, titled "Method and Apparatus for Listing Goods for Sale", filed Aug. 20, 2001, the disclosures of which are hereby incorporated herein by reference. --, therefor.

Signed and Sealed this
Twenty-eighth Day of December, 2010

David J. Kappos
*Director of the United States Patent and Trademark Office*